T. L. BURTON.
BRAKE RIGGING.
APPLICATION FILED MAR. 20, 1916. RENEWED MAR. 16, 1918.
1,281,510.
Patented Oct. 15, 1918.
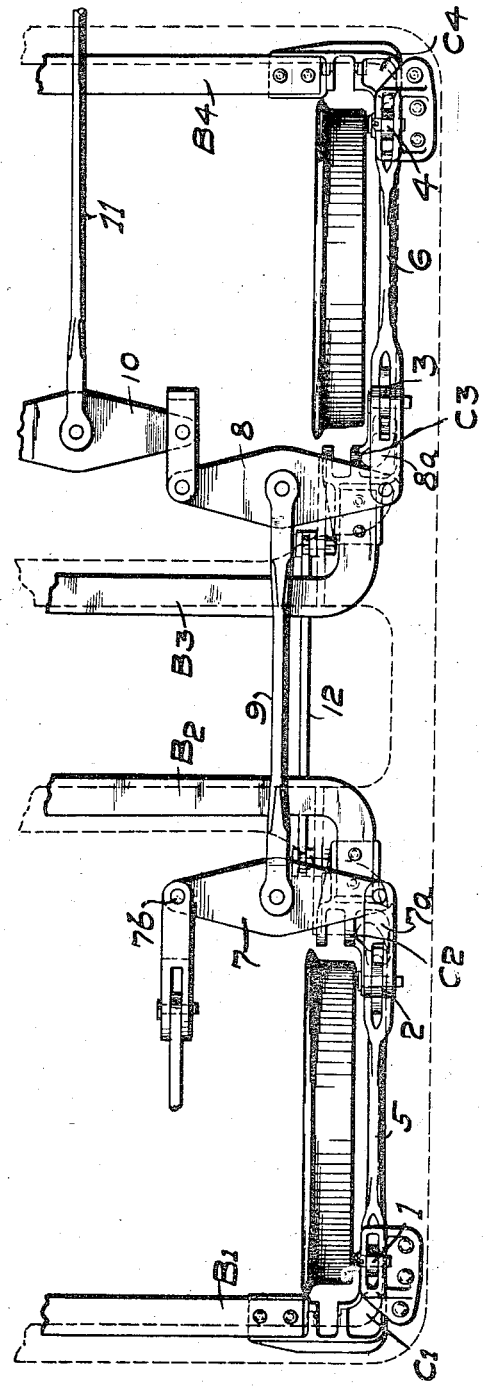
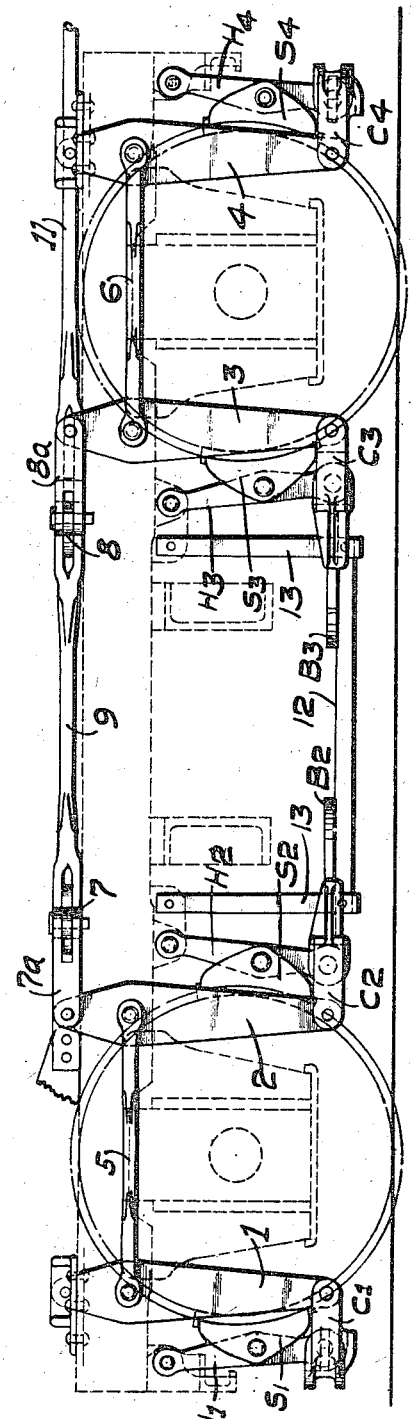
INVENTOR
Thomas L. Burton
by Edward A. Wright
Atty

UNITED STATES PATENT OFFICE.

THOMAS L. BURTON, OF ST. LOUIS, MISSOURI, ASSIGNOR TO AMERICAN BRAKE COMPANY, OF ST. LOUIS, MISSOURI, A CORPORATION OF MISSOURI.

BRAKE-RIGGING.

1,281,510.      Specification of Letters Patent.      Patented Oct. 15, 1918.

Application filed March 20, 1916, Serial No. 85,249. Renewed March 16, 1918. Serial No. 222,985.

*To all whom it may concern:*

Be it known that I, THOMAS L. BURTON, a citizen of the United States, residing at the city of St. Louis, in the State of Missouri, have invented a certain new and useful Improvement in Brake-Rigging, of which improvement the following is a specification.

This invention relates to brake rigging for railway car trucks, and particularly to a brake design of the clasp type in which brake shoes and brake beams are applied to both sides of each pair of wheels.

The object of my invention is to provide an improved rigging of this character which shall not interfere with the space around the car axles and between the wheels of each pair, where it is desired to have room for the location of electric motors, generators, and other equipment, and one feature comprises brake beams having curved or offset ends extending toward the wheels, and pivotally attached to the vertical truck levers. Another feature comprises the duplicate sets of vertical truck levers located on opposite sides and outside of each pair of truck wheels.

In the accompanying drawings: Figure 1 is a half plan of a clasp brake rigging embodying my improvement, the brake shoes and hanger levers being omitted; and, Fig. 2, a side elevation of the same with parts of the truck frame indicated in dotted lines.

According to the construction shown, the improvement is applied to a four wheeled truck having brake beams, $B^1$, $B^2$, $B^3$, and $B^4$, located at both sides of each pair of wheels, and pivotally connected at their ends to the lower ends of the vertical truck levers, 1, 2, 3 and 4, respectively, located outside of the truck wheels. For this purpose the brake beams have right angled projections at their ends extending toward and outside of the wheels, and these projections may be in the form of castings, $C^1$, $C^2$, $C^3$ and $C^4$, to which the respective truck levers are pivotally attached. The body of the brake beam may be turned at a right angle at its ends, and the castings be bolted thereto as indicated at brake beams $B^2$ and $B^3$, or the castings may be in the form of a right angle and be bolted to the straight ends of the beams as shown at $B^1$ and $B^4$.

The hanger levers, $H^1$, $H^2$, $H^3$ and $H^4$, are also pivotally attached at their lower ends to the respective brake beams or castings, and carry the brake heads and shoes, $S^1$, $S^2$, $S^3$ and $S^4$, respectively. The truck levers, 1 and 2, 3 and 4, are coupled in pairs by the tie rods, 5 and 6, respectively, which are located at intermediate points and above the journal boxes of the wheel axles, so as not to interfere with free access to the journal boxes for inspection, renewals and lubrication.

The truck levers may be operated in various ways, but a preferred construction comprises two sets of intermediate substantially horizontal levers, 7 and 8, one set at each side of the truck, and pivotally connected to the upper ends of the respective truck levers, 2 and 3, by means of links, $7^a$ and $8^a$. The truck levers, 1 and 4 at the opposite ends of the truck, are dead levers, having fulcrums at their upper ends fixed upon the truck frame. The intermediate levers, 7 and 8, are joined by the rod, 9, the lever, 7, having a fixed fulcrum at $7^b$, attached by an ordinary link and bracket to the frame, while the lever, 8, is a floating lever pivotally connected at its inner end with a cross equalizer, 10, having a pull rod 11, attached at its middle part.

For supporting the intermediate brake beams, there may be provided, in addition to the hanger levers, a suspended frame comprising a horizontal bar, 12, and two vertical hanger bars, 13, the brake beams, $B^2$ and $B^3$, being slidably supported on the bars, 12, at the opposite sides. When power is applied to the pull rod, 11, for applying brakes, the movement is transmitted by the equalizer, 10, to the intermediate levers, 8, upon opposite sides of the truck. This actuates the truck levers, 3 and 3, upon opposite sides of the truck and through rods, 9, and levers, 7, the truck levers, 2 and 1, are also operated so that the force is exerted throughout the system and the brake shoes are applied to both sides of all the wheels with equalized pressure.

It will be observed that by providing the lateral or right angled projections at the end of the brake beams, and pivotally connecting the truck levers thereto outside of the truck wheels, all of the space between the wheels and around the axles is left free for electric motors, generators, or other equipment which it may be desired to install in such location.

Having now described my invention, what I claim as new and desire to secure by Letters Patent is:

1. In a brake rigging for railway trucks having a plurality of pairs of wheels, the combination of brake beams applied to both sides of each pair of wheels, vertical truck levers pivotally connected to said brake beams and located outside of said wheels, and tension rods connecting said truck levers.

2. In a brake rigging for railway trucks having a plurality of pairs of wheels, the combination of brake beams applied to both sides of each pair of wheels, vertical truck levers pivotally connected to said brake beams and located outside of said wheels, hanger levers also pivotally attached to said brake beams, brake shoes mounted on said hangers, and tension rods connecting said truck levers.

3. In a brake rigging for railway trucks having a plurality of pairs of wheels, the combination of brake beams applied to both sides of each pair of wheels, vertical truck levers pivotally connected to said brake beams and located outside of said wheels, tension rods coupling said levers in pairs, and a pair of intermediate horizontal levers pivotally connected to intermediate truck levers.

4. In a brake rigging for railway trucks having a plurality of pairs of wheels, the combination of brake beams applied to both sides of each pair of wheels, two sets of vertical truck levers, one on each side of the truck, pivotally connected at their lower ends to the ends of the brake beams, and located outside of the said wheels, tension rods connecting said levers at intermediate points in pairs, a double set of intermediate horizontal levers pivotally connected to truck levers on opposite sides, and a cross equalizer for actuating said intermediate levers.

5. In a brake rigging for railway trucks having a plurality of pairs of wheels, the combination of brake beams applied to both sides of each pair of wheels, said brake beams having projections at their ends extending toward and outside of the wheels, vertical truck levers pivotally connected to said projections, and tension rods connecting said truck levers.

6. In a brake rigging for railway trucks having a plurality of pairs of wheels, the combination of brake beams applied to both sides of each pair of wheels, said brake beams having right angled projections at their ends, vertical truck levers pivotally connected to said projections outside the wheels, hanger levers pivotally attached at their lower ends to said projections, and tension rods connecting said truck levers.

7. In a brake rigging for railway trucks having a plurality of pairs of wheels, the combination of brake beams applied to both sides of each pair of wheels, truck levers pivotally connected to the ends of said brake beams, and suspended frames, one at each side of the truck, and comprising a horizontal bar slidably supporting adjacent intermediate brake beams, and vertical hanger bars.

In testimony whereof I have hereunto set my hand.

THOMAS L. BURTON.